United States Patent
Vasseur et al.

(10) Patent No.: US 9,553,813 B2
(45) Date of Patent: Jan. 24, 2017

(54) SELECTIVELY EMPLOYING DYNAMIC TRAFFIC SHAPING

(71) Applicant: Cisco Systems, Inc., San Jose, CA (US)

(72) Inventors: Jean-Philippe Vasseur, Saint Martin d'Uriage (FR); Sukrit Dasgupta, Norwood, MA (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 14/338,823

(22) Filed: Jul. 23, 2014

(65) Prior Publication Data

US 2016/0028637 A1    Jan. 28, 2016

(51) Int. Cl.
*H04L 12/825* (2013.01)
*H04L 12/841* (2013.01)
*H04L 12/801* (2013.01)

(52) U.S. Cl.
CPC ............ *H04L 47/25* (2013.01); *H04L 47/127* (2013.01); *H04L 47/283* (2013.01)

(58) Field of Classification Search
None
See application file for complete search history.

(56) References Cited

U.S. PATENT DOCUMENTS

| | | | |
|---|---|---|---|
| 7,292,532 B2 | 11/2007 | Sakata et al. | |
| 7,392,279 B1 | 6/2008 | Chandran et al. | |
| 7,606,147 B2 | 10/2009 | Luft et al. | |
| 8,069,465 B1 * | 11/2011 | Bartholomay | H04L 47/14 370/395.4 |
| 8,243,597 B2 | 8/2012 | Castaneda et al. | |
| 2004/0174883 A1 * | 9/2004 | Johansson | H04L 45/302 370/395.31 |
| 2004/0258043 A1 * | 12/2004 | Engbersen | H04L 47/10 370/351 |
| 2007/0118636 A1 * | 5/2007 | Yang | H04L 12/5695 709/223 |
| 2012/0281590 A1 * | 11/2012 | Szabo | H04L 41/145 370/253 |
| 2014/0071822 A1 * | 3/2014 | Rochon | H04L 41/5009 370/230.1 |
| 2015/0263944 A1 * | 9/2015 | Tsukernik | H04L 45/74 709/244 |

OTHER PUBLICATIONS

Sajassi et al., "BGP MPLS Based Ethernet VPN", Network Working Group Internet-Draft, <draft-ietf-l2vpn-evpn-07>, May 7, 2014, 50 pages, Internet Engineering Task Force Trust.

* cited by examiner

*Primary Examiner* — Diane Lo
(74) *Attorney, Agent, or Firm* — Parker Ibrahim & Berg LLC; James M. Behmke; Stephen D. LeBarron

(57) ABSTRACT

In one embodiment, a device in a network identifies a set of one or more destination addresses for which traffic shaping is to be performed by controlling the data rate at which traffic is sent to the one or more destination addresses. The device sends the traffic to one of the destination addresses along a communication path in the network and at a particular data rate. The device identifies a change in a performance characteristic for the communication path. The device adjusts the data rate at which the traffic is sent along the communication path, in response to identifying the change in the performance characteristic for the communication path.

20 Claims, 14 Drawing Sheets

SELECTIVELY EMPLOYING DYNAMIC TRAFFIC SHAPING

TECHNICAL FIELD

The present disclosure relates generally to computer networks, and, more particularly, to selectively employing dynamic traffic shaping.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. However, such a reactive approach may also, by its very nature, mean that the network experiences periods of reduced performance before corrective measures are taken.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network identifies a set of one or more destination addresses for which traffic shaping is to be performed by controlling the data rate at which traffic is sent to the one or more destination addresses. The device sends the traffic to one of the destination addresses along a communication path in the network and at a particular data rate. The device identifies a change in a performance characteristic for the communication path. The device adjusts the data rate at which the traffic is sent along the communication path, in response to identifying the change in the performance characteristic for the communication path.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
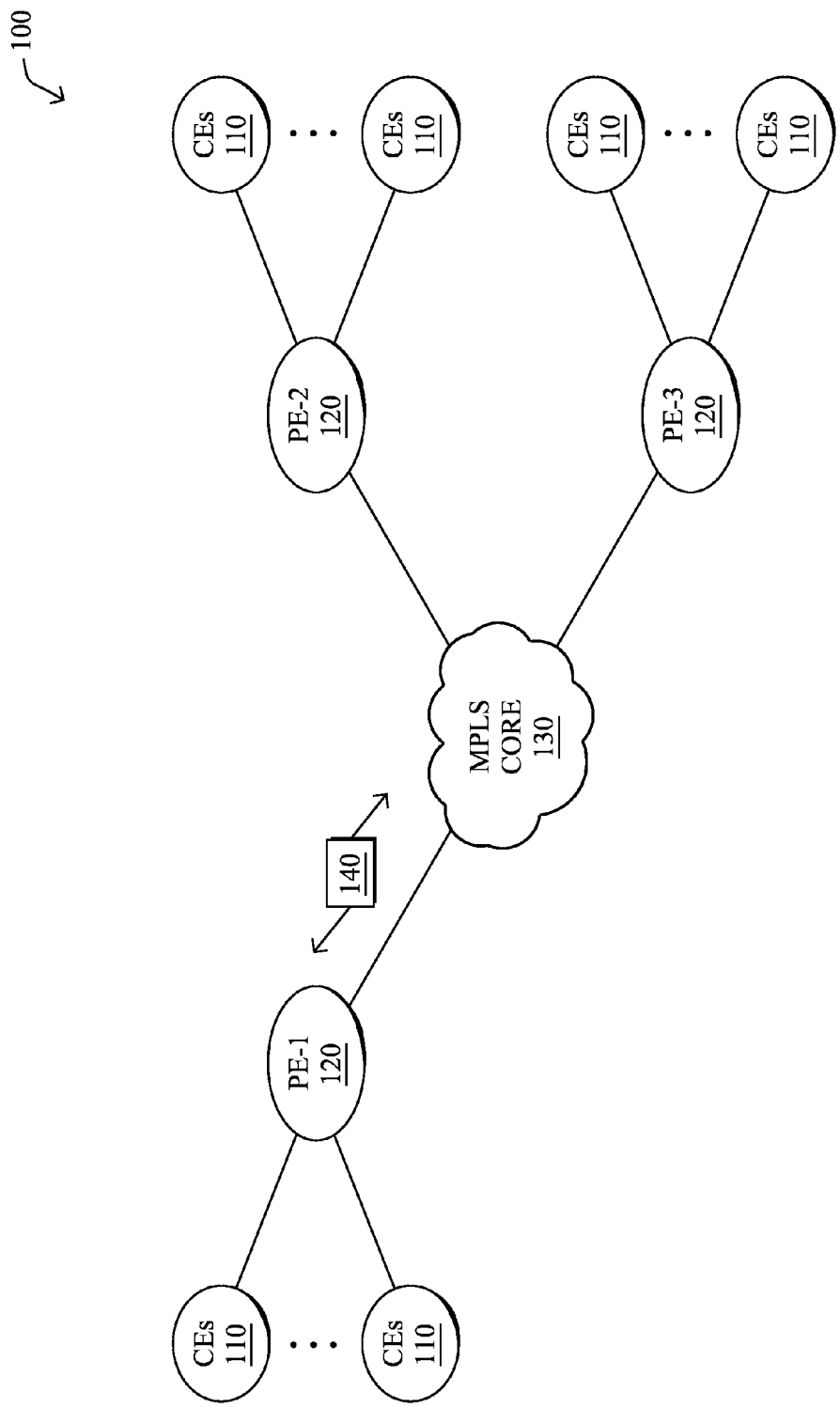
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

4.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Figure 2:
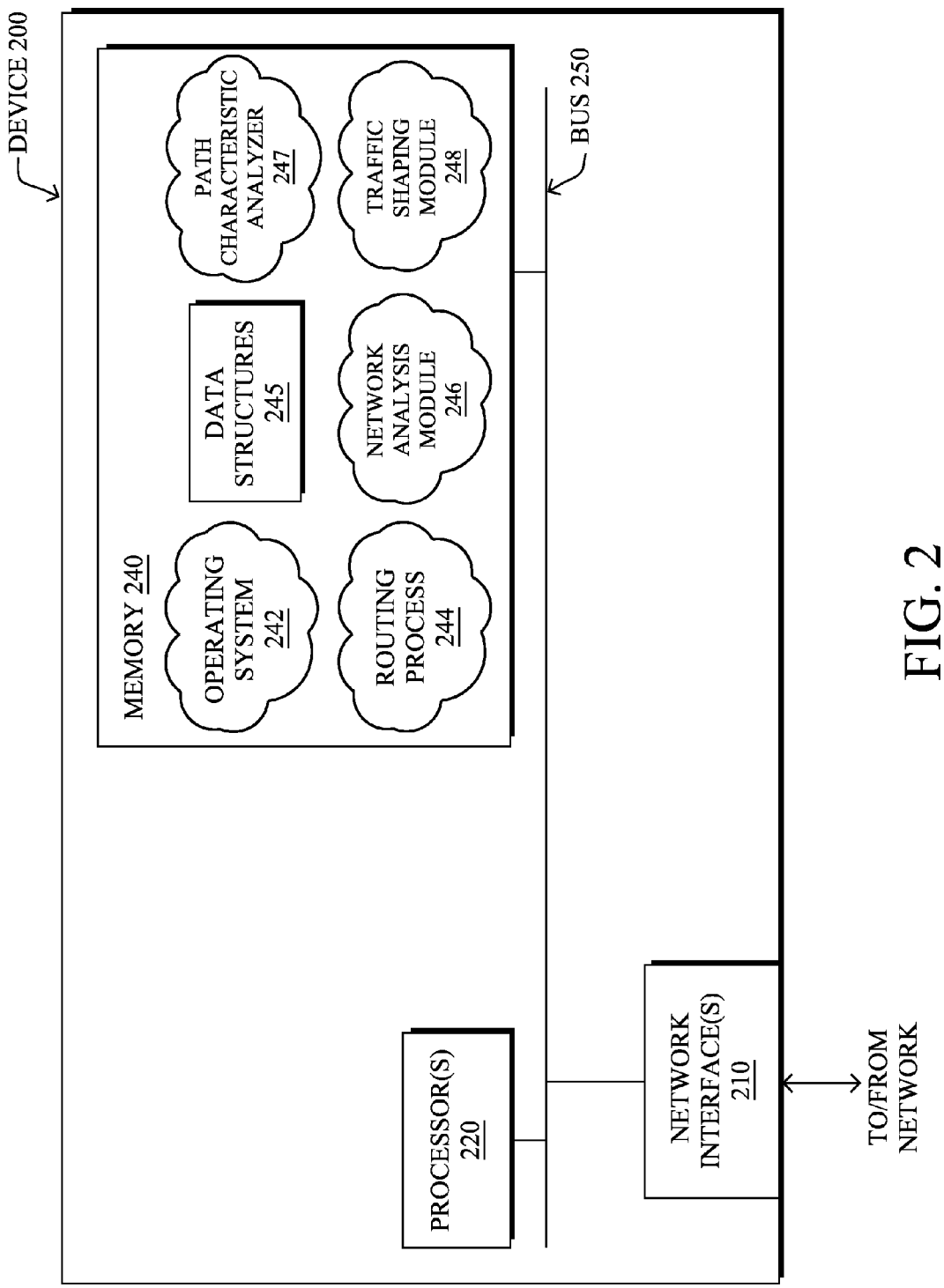
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CE routers 110, a network controller or network management system (NMS) (e.g., a device associated with a network operations center (NOC)), or any other computing device that supports the operations of network 100 (e.g., switches, etc.). Device 200 comprises a plurality of network interfaces 210, one or more processors 220, and a memory 240 interconnected by a system bus 250. The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a network analyzer module (NAM) 246, a path characteristics analyzer (PCAN) 247, and/or a traffic shaping module 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

NAM 246 includes computer executable instructions executed by processor 220 to predict future network conditions, based on a history of network conditions. According to various embodiments, NAM 246 may employ machine learning to predict the future network conditions. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In general, learning machines, such as those that may be used by NAM 246, are computational entities that rely on one or more machine learning processes for performing a task for which they have not been explicitly programmed to perform. In particular, learning machines are capable of adjusting their behavior to their environment. For example, a learning machine may dynamically make future predictions based on current or prior network measurements may make control decisions based on the effects of prior control commands, etc.

The learning machine(s) of NAM 246 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by NAM 246 may include, but are not limited to, support vector machines (SVMs), Bayesian networks, regression techniques (e.g., logistic regression, linear regression, non-linear regression, etc.), combinations thereof, or any other form of machine learning.

Traffic shaping module 248 includes computer executable instructions executed by processor 220 to manage how flows of traffic are conveyed within a network. In general, traffic shaping attempts to "shape" the data rate at which traffic is sent from a network device to another network device. For example, traffic shaping module 248 may make use of any number of queues (e.g., data structures 245), to shape a traffic rate by delaying when the device sends certain packets. In some embodiments, traffic shaping module 248 may apply different shaping rates to different classes of traffic (e.g., video traffic, web traffic, etc.). Such classes may be distinguished, for example, by "colors" (e.g., data bits) set in the headers of packets, thereby allowing a device to identify the traffic class and apply a traffic policing policy to the packet, accordingly.

PCAN 247 includes computer executable instructions executed by processor 220 to analyze the one or more characteristics of a network path (e.g., delay, jitter, etc.). According to various embodiments and described further below, PCAN 247 may operate in conjunction with traffic shaping module 248 and/or NMS 246, to trigger the dynamic adjustment of a traffic shaping data rate by traffic shaping module 248, based on the path characteristics. In some cases, PCAN 247 may analyze the path characteristics using a clustering technique. In general, clustering refers to a family of techniques whose objective is to group objects according to some usually predefined notion of similarity. Example clustering techniques that may be employed by PCAN 247 include, but are not limited to, k-means, density-based spatial clustering of applications with noise (DB-SCAN), or Mean-Shift approaches.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performance in terms of connectivity and bandwidth.

One technique that may be used to achieve a desired quality of service (QoS) is traffic shaping. In general, traffic shaping involves regulating the data rate(s) at which traffic is sent. For example, certain traffic (e.g., video traffic) may be sent at a higher data rate than other types of less critical traffic and in accordance with the overall data rate guaranteed by the service provider. Thus far, traffic shaping has been used mostly as part of a virtual circuit paradigm, such as frame relay with an associated bandwidth guarantee (e.g., a committed information rate (CIR), other parameters, etc.), or asynchronous transfer mode (ATM) switching with permanent virtual circuits (PVCs) or switched virtual circuits (SVCs) where certain performance guarantees (e.g., bandwidth, delay, etc.) are provided along a given path.

Selectively Employing Dynamic Traffic Shaping

The techniques herein provide mechanisms whereby traffic shaping may be adjusted dynamically and automatically on a per-destination and per-class of service basis. In some aspects, the set of destinations, classes of service of interest, and/or a set of rules used by a remote device to determine the set of destinations may be provided to a network device. In another aspect, a path characteristic analyzer (e.g., PCAN 247) may determine the variability of a path to one or more destinations of interest based on a set of monitored variables that can be either predicted or observed. Using these variables, the path characteristic analyzer may determine when traffic shaping rate adjustments are required. In a further aspect, dynamic traffic shaping may be activated or deactivated according to the characteristics of the destination, the path variability used by the destination, and also the local states tracked by the analyzer that reflects the effect of shaping, as part of a control-loop mechanism.

Specifically, according to one or more embodiments of the disclosure as described in detail below, a device in a network identifies a set of one or more destination addresses for which traffic shaping is to be performed by controlling the data rate at which traffic is sent to the one or more destination addresses. The device sends the traffic to one of the destination addresses along a communication path in the network and at a particular data rate. The device identifies a change in a performance characteristic for the communication path. The device adjusts the data rate at which the traffic is sent along the communication path, in response to identifying the change in the performance characteristic for the communication path.

Illustratively, the techniques described herein may be performed by hardware, software, and/or firmware, such as in accordance with processes 244 and 246-248 which may contain computer executable instructions executed by the processor 220 (or independent processor of interfaces 210) to perform functions relating to the techniques described herein. For example, the techniques herein may be treated as extensions to conventional protocols, such as the various networking protocols or wireless communication protocols, and as such, may be processed by similar components understood in the art that execute those protocols, accordingly.

Operationally, a network may have radically different sets of path characteristics due to any number of factors. For example, the characteristics of a path may depend on the type of access links along the path (e.g., DSL, cable, fiber optic, etc.), the path size (e.g., the size of the network backbone, the number of traversed autonomous systems, etc.), and/or the set of QoS policies used along these paths (e.g., input shaping, rate limiters, policy of traffic in excess, use of random early discard mechanisms, link traffic engineering, etc.). Accordingly, path characteristics may be highly heterogeneous in a network according to the destination.

Figure 3A:
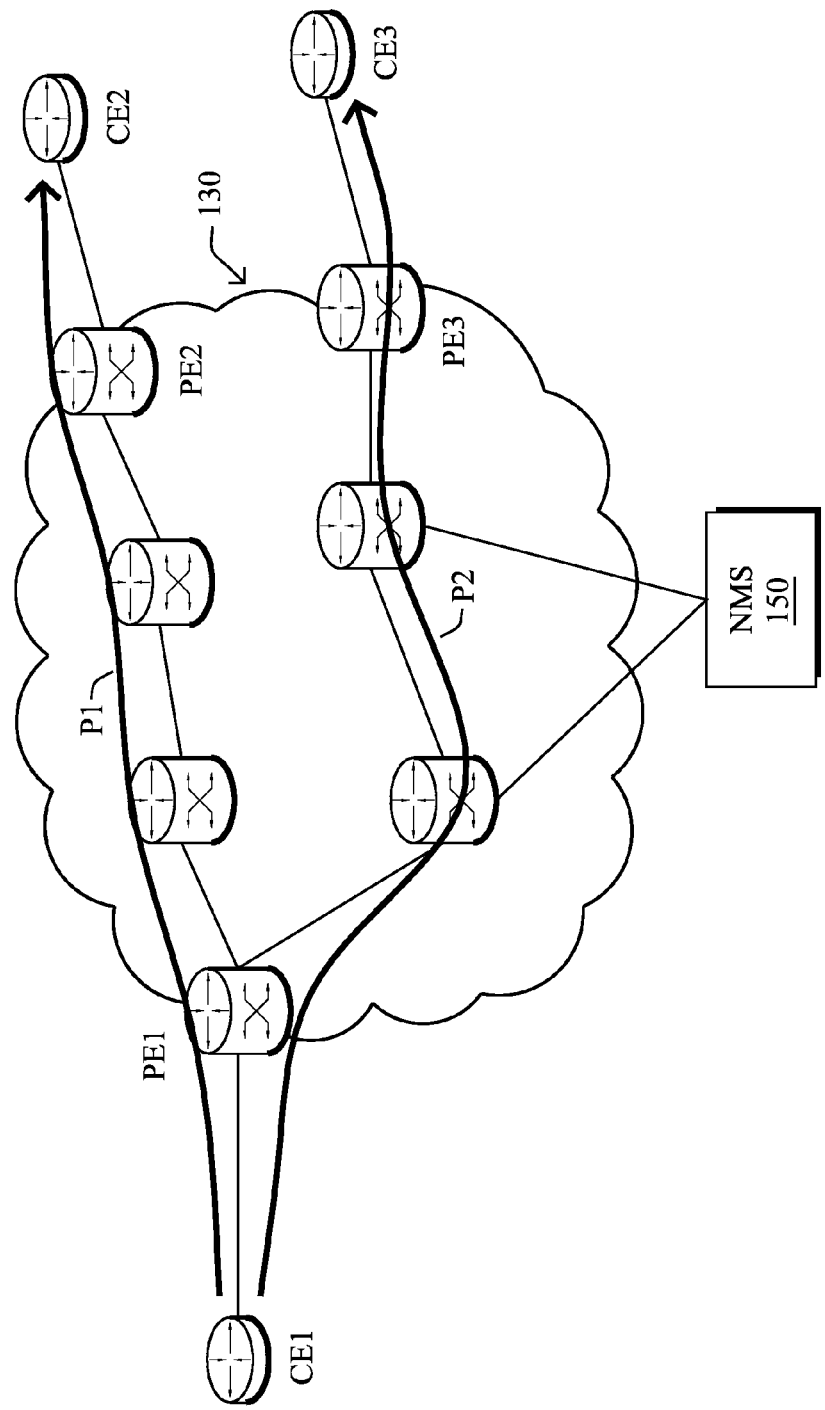
FIGS. 3A-3G illustrate an example view of a network device performing dynamic traffic shaping on a per-destination basis.

Referring now to FIGS. 3A-3G, an example view is shown of a network device performing dynamic traffic shaping on a per-destination basis, according to various embodiments. As shown in FIG. 3A, assume that a particular CE router 110 (CE1) sends traffic to a plurality of destinations (e.g., CE2, CE3, etc.) along a number of different network paths (e.g., P1, P2, etc.) in computer system 100. Overseeing operation of system 100 may also be a centralized networking device, such as an NMS 150, network controller, or the like.

Figure 3B:
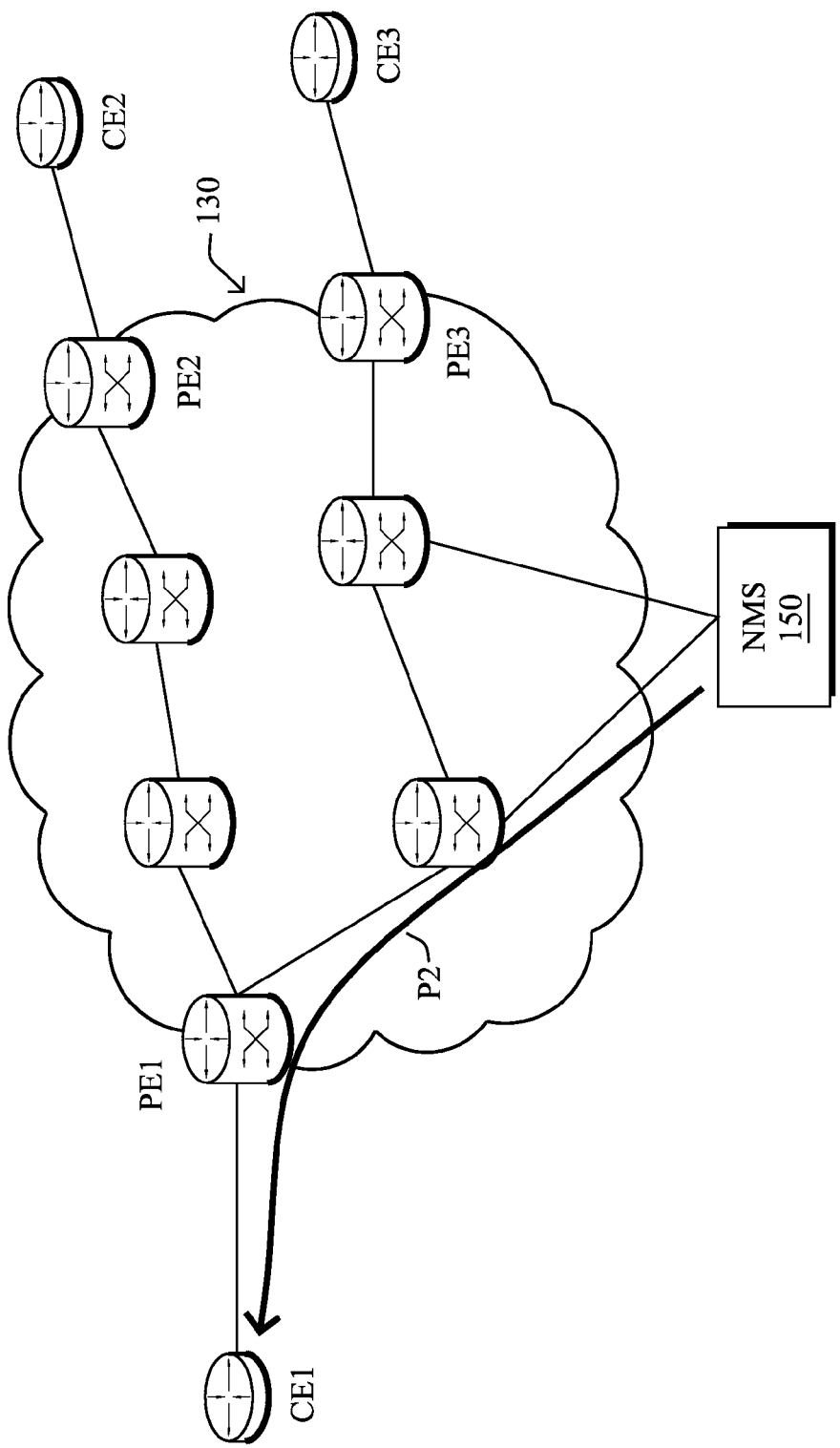

In some embodiments, a custom message referred to as crit_dest( ) may be sent by an NMS, network controller, or other centralized network device, to an end node (e.g., a CE router such as in a branch office, a field area router in the IoT, etc.). The crit_dest( ) message may indicate a white list of destinations for which per-destination traffic shaping is required. For example, as shown in FIG. 3B, NMS 150 may send a destination list 302 as part of a crit_dest( ) message to CE1 that indicates the addresses or other identifiers for the corresponding destinations. Destination list 302 may be specified in the form of IP addresses, blocks of IP addresses, prefix-mask combinations, hostnames (e.g., to be resolved via DNS), or any other way to indicate the destinations for which traffic shaping is to be performed by CE1. Notably, destination list 302 may indicate a single network destination by CE1, a subset of the total number of network destinations used by CE1, or may even include entries for each destination used by CE1.

In some cases, a crit_dest( ) message may be extended to further associate a particular destination with a traffic class, traffic coloring (e.g., values of the IPv4 Type of Service (TOS) field, the IPv6 DSCP or Flow Label Field, etc.), or a period of time during which traffic shaping to the destination is to be performed. For example, destination list 302 may indicate that CE1 is to perform dynamic traffic shaping only on a certain traffic class destined for CE3 and at a certain time of day. In response to receiving such a message, the receiving device may then automatically configure a traffic shaping mechanism for the identified combinations of destinations, traffic classes, traffic colorings, and/or shaping time periods. In other words, the crit_dest( ) may indicate a rule/set of parameters that control when and how CE1 is to perform traffic shaping. In further embodiments, the rule may indicate that traffic shaping is to be performed for the top n-number of destinations in terms of traffic volume and, optionally for a particular traffic class or time period.

In further implementations, the rule specified by the crit_dest( ) message may be conditioned on local network state tracking. For example, NMS 150 may specify to CE1 that CE1 is to activate a traffic shaper for each destination in destination list 302 having a specific traffic profile (e.g., volume of traffic, traffic class, etc.), only if specific conditions take place in the network. Such conditions may include, for example, an increase in the number of observed packet drops (e.g., which may be indicative of a potential network bottleneck), requiring activation of traffic shaping at CE1 to discriminate which QoS parameters should be provided to which traffic. Observed network conditions that may trigger dynamic traffic shaping may be received via an application and visibility control (AVC) mechanism, via an explicit network notification such as an explicit congestion notification (ECN), an RSVP path error notification, etc.

Figure 3C:
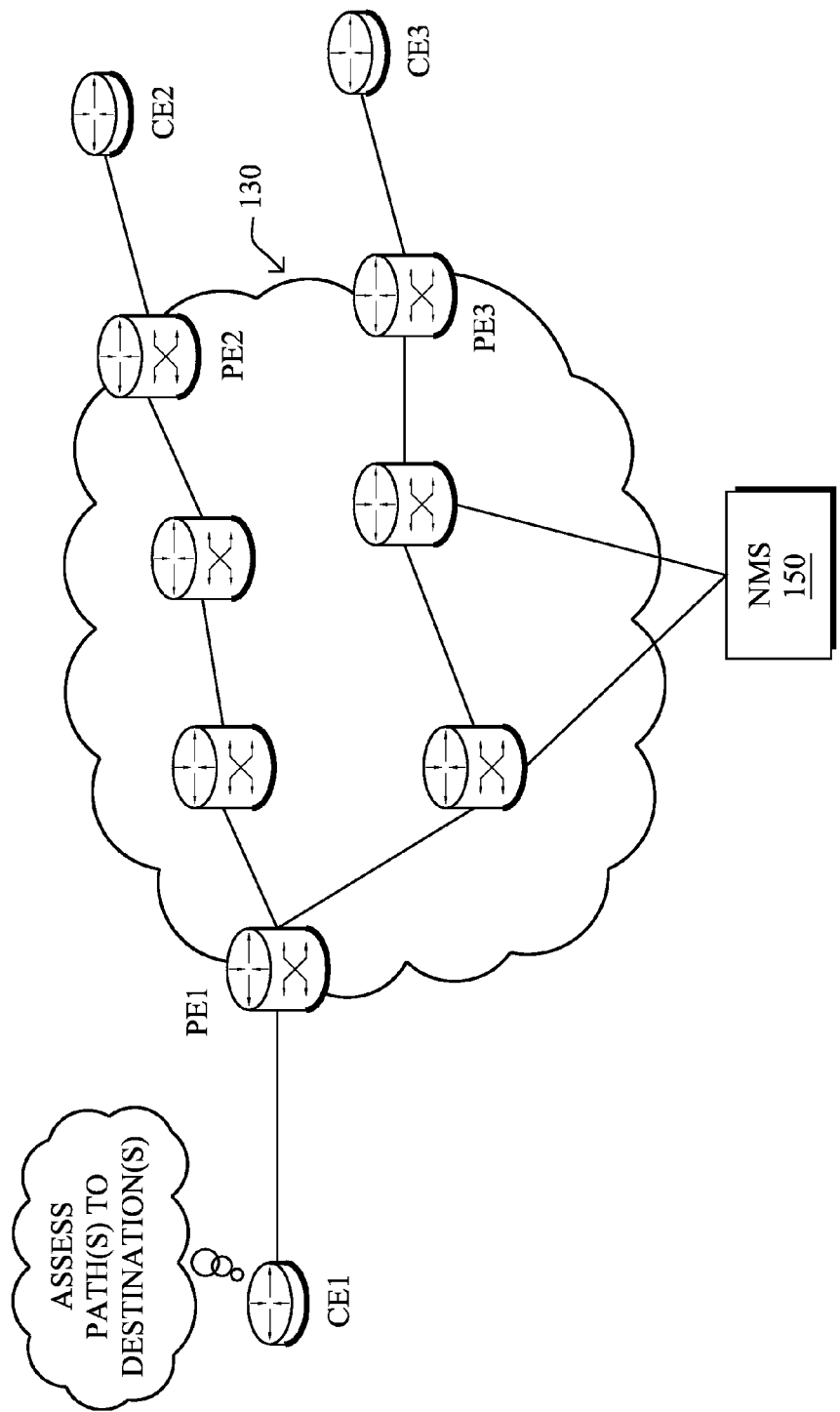
Figure 3D:
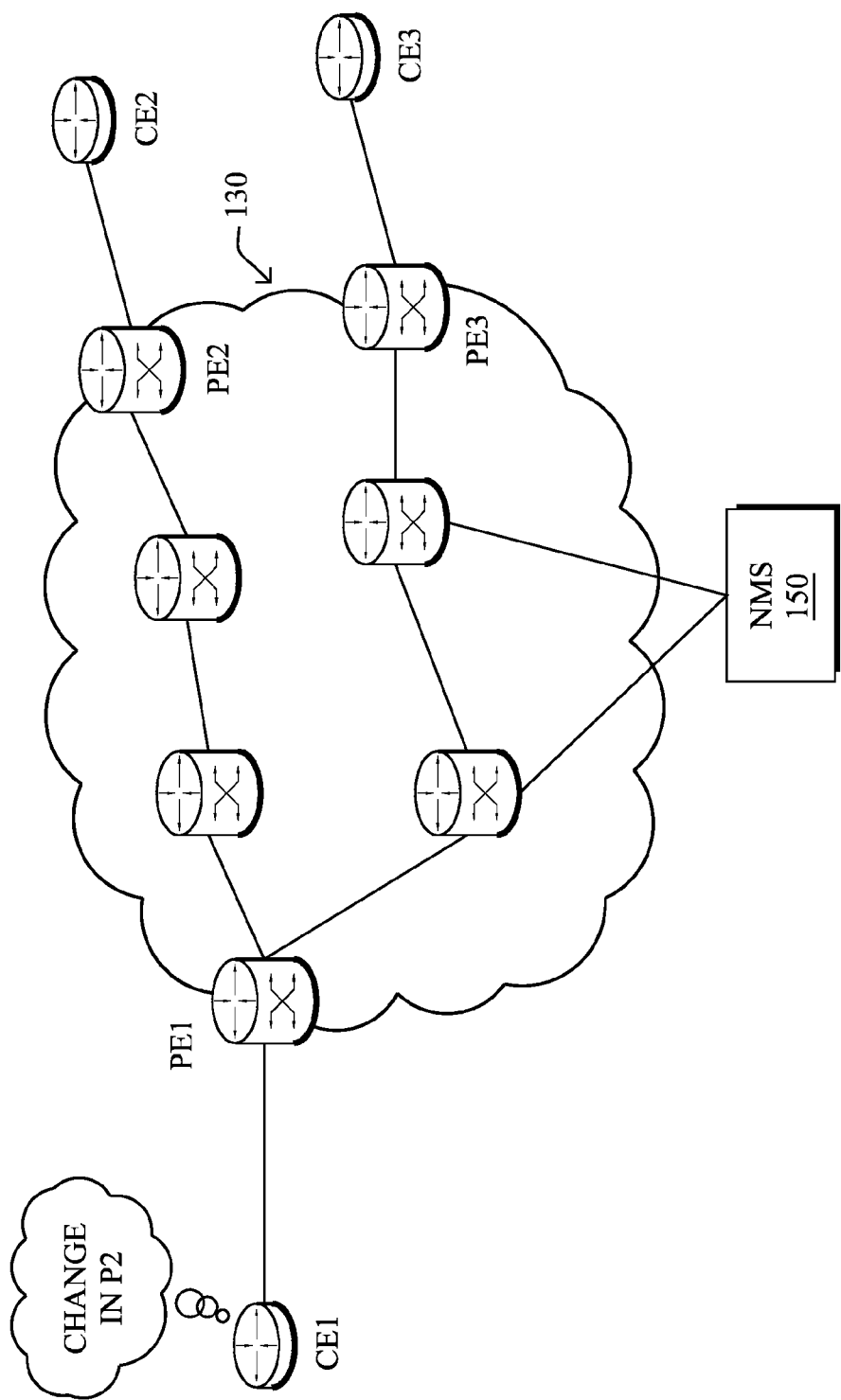
Figure 3E:
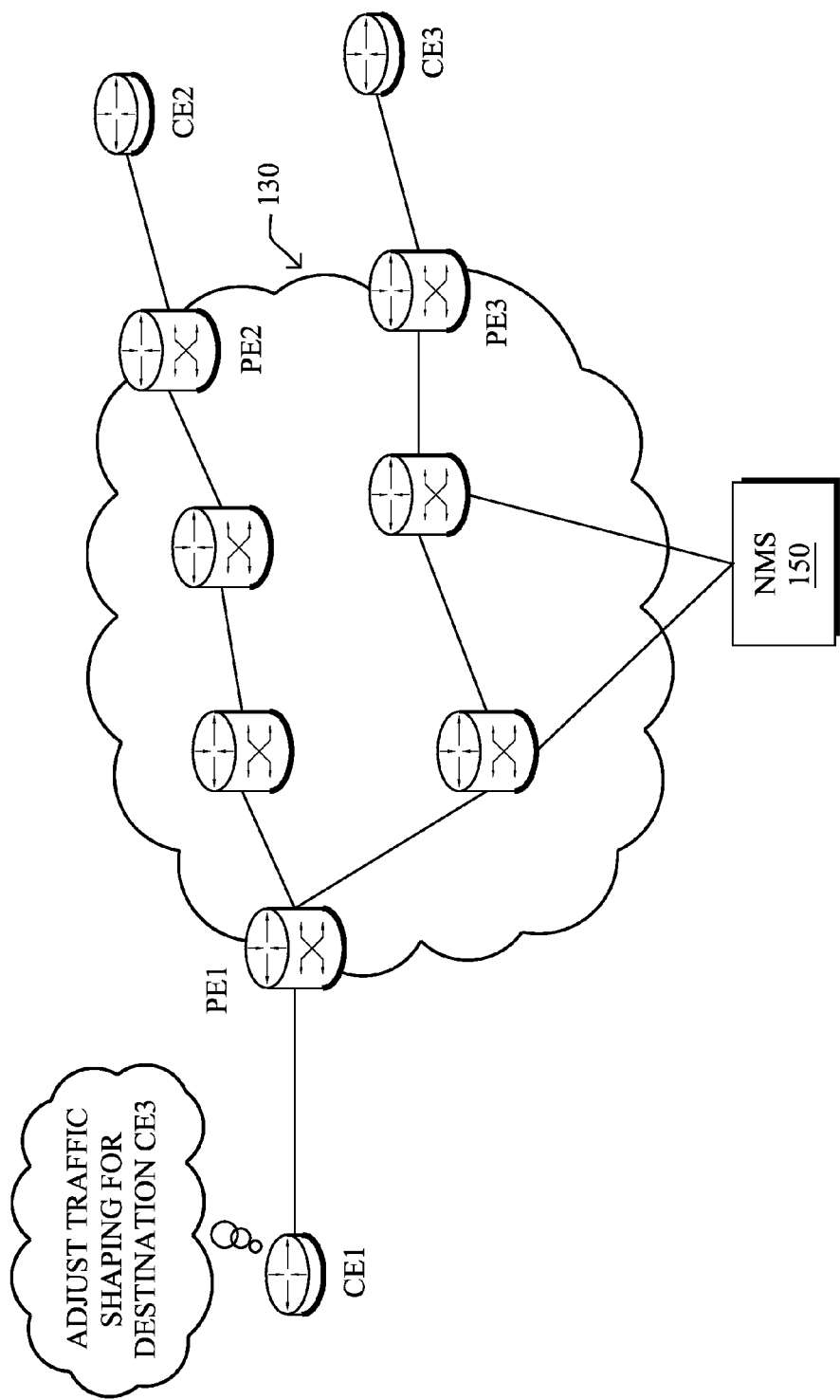

In various embodiments, traffic shaping may be performed by a network device (e.g., by traffic shaping module 248) according to the observed and/or predicted characteristic(s) of a communication path to a particular destination (e.g., by PCAN 247). In general, traffic shaping is typically only one component of a QoS toolbox, but is still an important tool to adapt the sending rate to the available network resource. Notably, traffic shaping is also typically performed as a static process whereby a user manually sets a shaping rate and that rate is used in all cases going forward (e.g., path characteristics and other factors are not used to condition the triggering of dynamic traffic shaping). According to various embodiments, such dynamic shaping may be triggered by PCAN 247 that monitors the path characteristics for a set of destinations. Such a set may be specified in a crit_dest( ) message or, in some cases, the device itself may employ its own rules to determine the destination list. For example, as shown in FIGS. 3C-3E, CE1 may assess the characteristics of a path to a destination in destination list 302 (e.g., path P2), identify a change in the characteristics of the path, and, in response, adjust the traffic shaping rate used to reach destination CE3 via path P2.

Figure 3F:
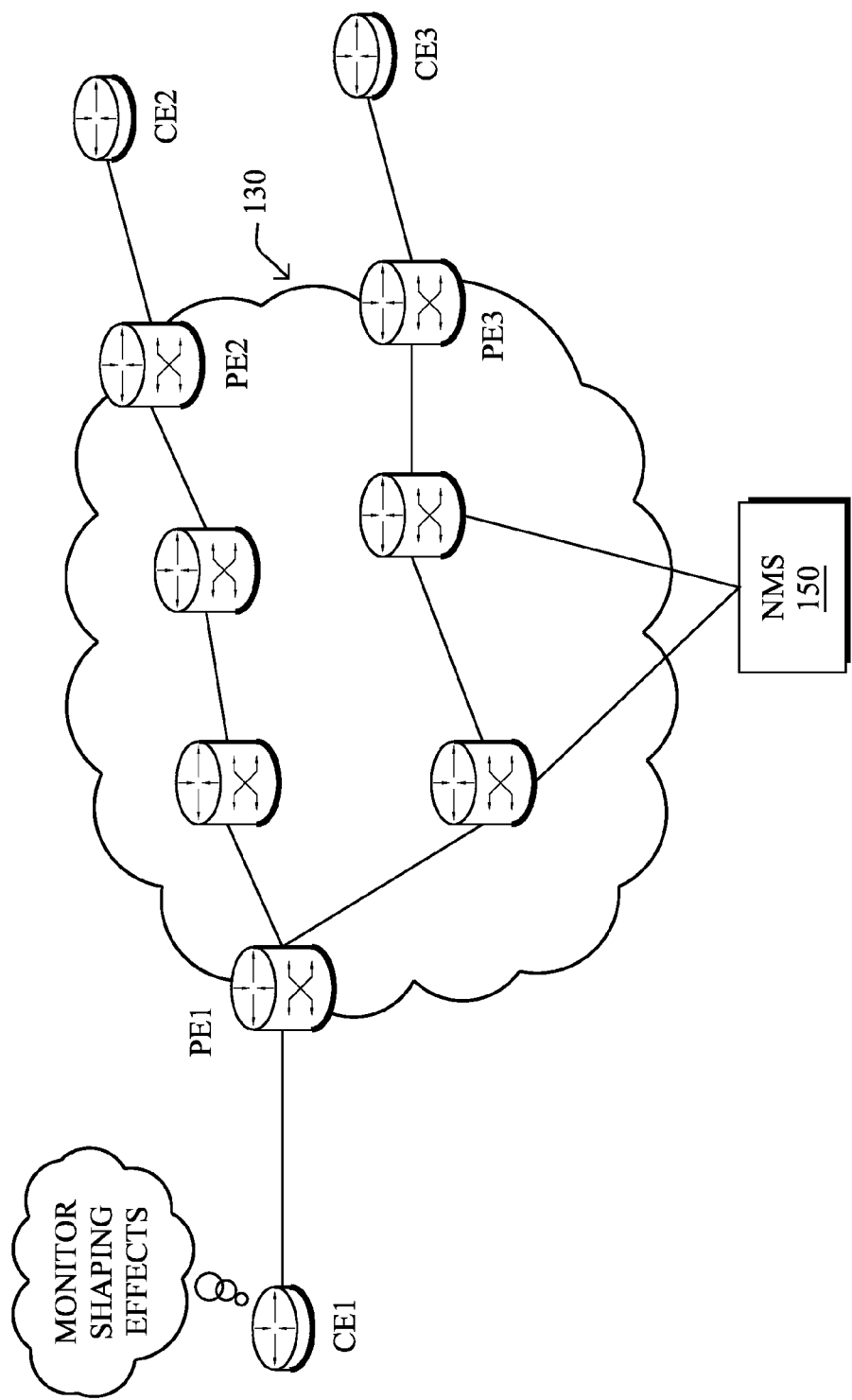

As shown in FIG. 3F, a closed-loop control mechanism may be used by a device, to continually adjust a traffic shaping rate to a destination, based on monitored effects of the shaping. In some cases, once the path characteristics become favorable again and fall below one or more thresholds, dynamic traffic shaping may be stopped again until a triggering condition is again present. In one embodiment, the times at which dynamic traffic shaping is employed may be recorded for future time series prediction purposes. In another embodiment, the traffic shaping configuration may be recorded to be quickly applied proactively when the thresholds are approached again in the future.

Figure 3G:
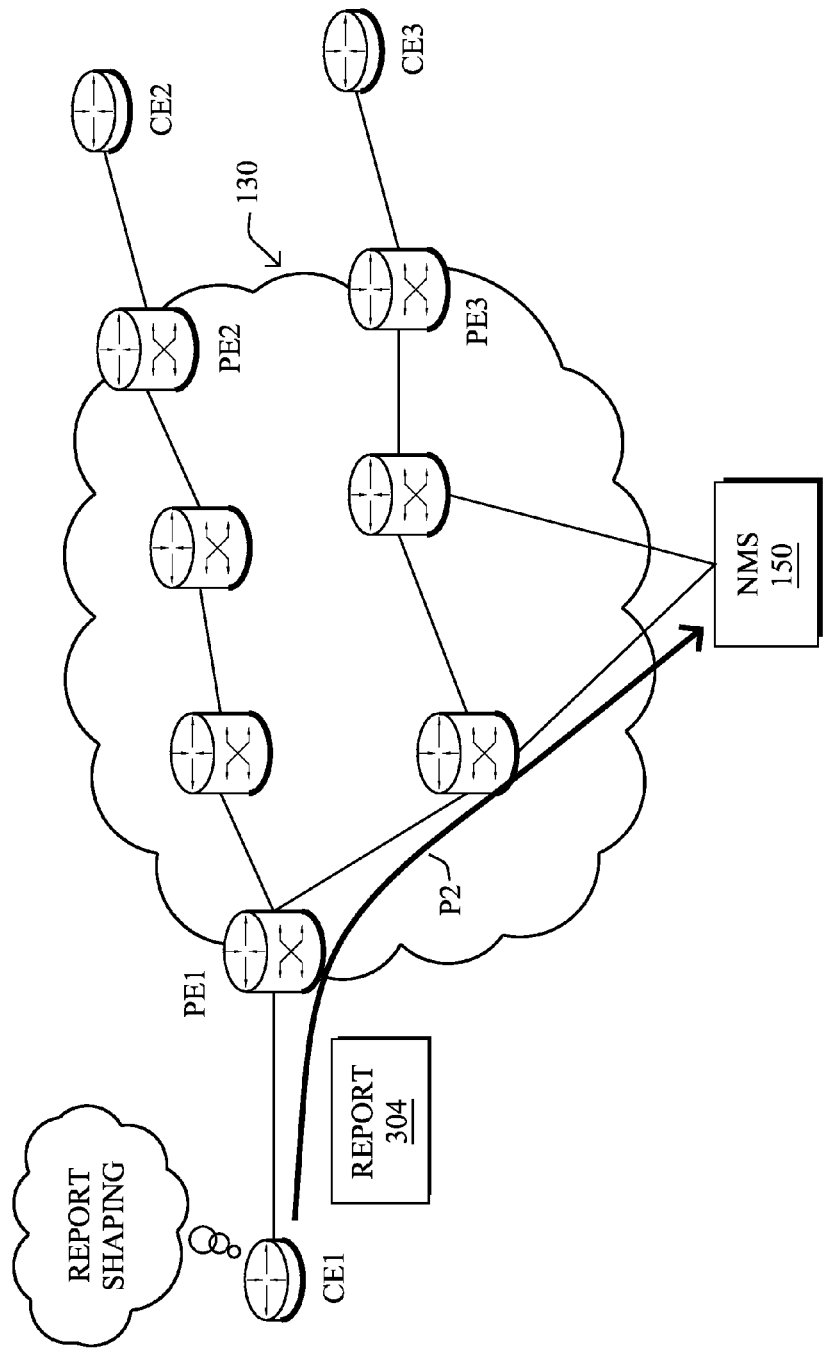

As shown in FIG. 3G, a report 304 may be sent by CE1, a field area router, etc., to report on its traffic shaping decisions. For example, report 304 may include the list of the top n-number of destinations of the device (e.g., on a per-traffic class basis), the rate adjustments according to the predicted and/or observed path characteristics, the local state tracking results from the dynamic shaping rate adjustment strategy, or the like.

Figure 4:
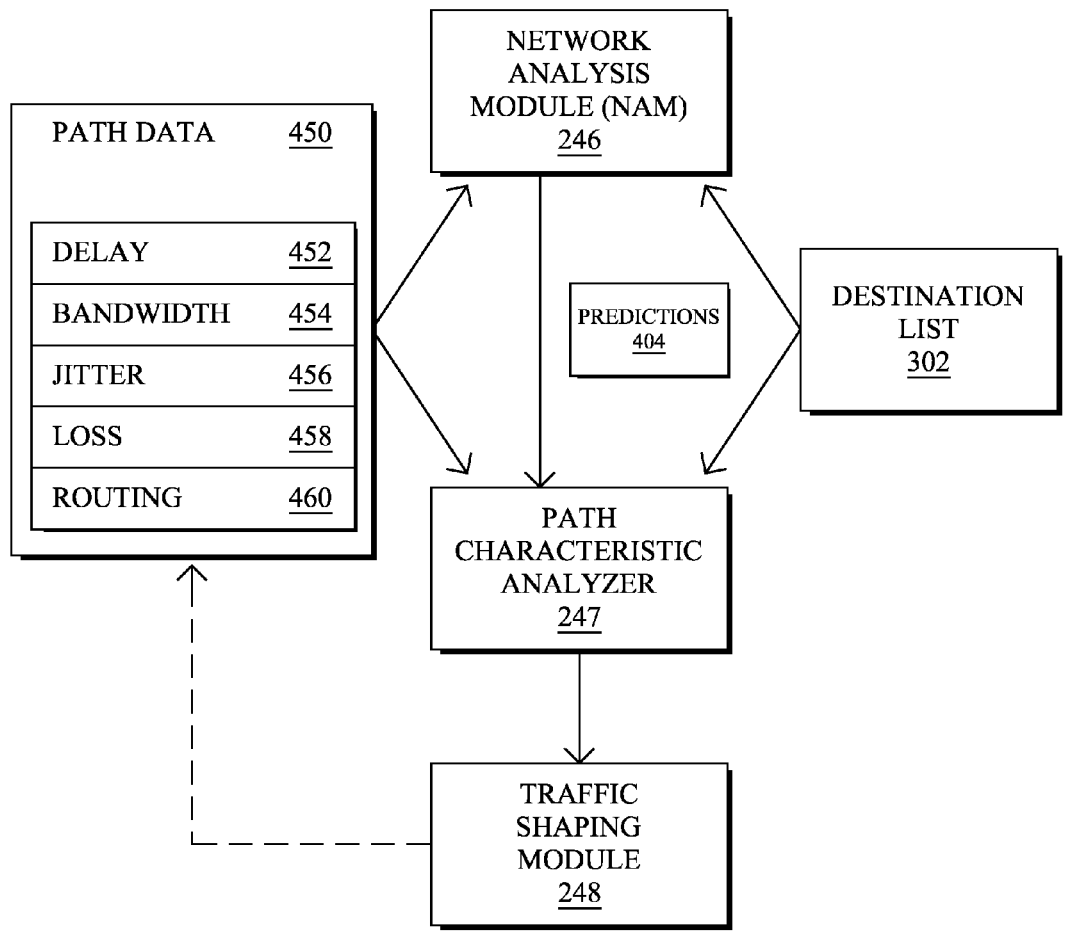
FIG. 4 illustrates an example architecture for performing dynamic traffic shaping.

FIG. 4 illustrates an example architecture 400 for performing dynamic traffic shaping, according to various embodiments. As would be appreciated, path data 450, destination list 302, and modules 246-248 may be located on the same device (e.g., a particular CE router 110) or may be distributed across different devices, in various implementations. In general, PCAN 247 is configured to identify a change in a performance characteristic of a path associated with a destination in destination list 302 based on path data 450 and in accordance with any other rules/conditions (e.g., an associated traffic class, a specified period of time, etc.). In response to identifying such a change, PCAN 247 may trigger dynamic traffic shaping to the destination by notifying traffic shaping module 248 using a custom message that includes the path characteristic. In turn, traffic shaping module 248 may dynamically adjust a traffic data rate, in an attempt to achieve a desired path characteristic.

In various embodiments, path data 450 may include any or all of the following information:

1.) Delay Information 452: In some cases, path data 450 includes delay measurements along a given network path and/or link.

2.) Bandwidth Information 454: Path data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Path data 450 may further include jitter information associated with a given path and/or link. For example, the total amount or application-specific jitter measurements along a path or link may be included in path data 450.

4.) Packet Loss Information 458: In some cases, path data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined).

In some cases, PCAN 247 may measure the degree of variability along a path P (denoted DV(P) herein) that has a destination in destination list 302. Notably, destination list 302 may be received as part of a crit_dest( ) message or may be determined dynamically by PCAN 247, in various cases. For example, PCAN 247 may determine destination list 302 based on the top n-number of destinations of the device. In some cases, the characteristic of the path may be represented as a vector v where each coordinate specifies a different path metric (e.g., delay 452, bandwidth 454, jitter 456, packet loss 458, etc.). PCAN 247 may then compute DV(P) using any number of different techniques. For example, if the corresponding vector space has a dimension of size n, then PCAN 247 may use clustering to determine the distance of DV(P) to the clusters of values of v over time, to tell whether the path characteristics from path data 450 have changed significantly (e.g., exceed a deviation threshold which itself may be dynamic or static) for a path to a given destination. In another example, PCAN 247 may detect a change in the probability distribution function (PDF) of the characteristic. If PCAN 247 detects a characteristic deviation, it may notify traffic shaping module 248, thereby triggering a data rate adjustment by traffic shaping module 248 for the corresponding destination.

In some embodiments, PCAN 247 may also identify a predicted path characteristic change, thereby triggering traffic shaping by traffic shaping module 248. For example, as shown, NAM 246 may provide path predictions 404 to path characteristic analyzer 247, to determine whether a path characteristic is predicted to deviate from the expected characteristic at some point in the future (e.g., by calculating DV(P) using predictions 404). Notably, NAM 246 may use path data 450 as inputs to a learning machine that continually tracks path data 450 (e.g., as a time series model), to characterize these attributes. In other words, NAM 246 may use a predictive model to predict future performance metrics based on path data 450, thereby generating characteristic predictions 404.

NAM 246 may use the principle of data fusion to model the path characteristics. This principle generally functions by integrating multiple data sources and knowledge about a real-world process (in this case, the underlying network), into an accurate representation of the functioning of the network. For example, bandwidth data 454 along a given path may be available from any of the following source: (1) SLA processors may yield data about the delay, jitter, and packet loss along a path, which can, in some circumstance, be used to estimate the available bandwidth via a regression model, such as variational Bayesian least squares (VBLS) regression model, (2) actual bandwidth measurements can be taken occasionally, but with care as they affect the network performance, or (3) time-series models such as autoregressive moving average (ARMA) models, Hidden Markov Models, Gaussian Processors can be used to predict the performance evolution.

Path data 450 available from various sources of information can be fused by NAM 246 in real time in a mathematically principled way by using a Kalman filter or graphical models, whereby the intrinsic uncertainty of each source of information is accounted for in the estimation of the data (e.g., available bandwidth, etc.). For example, if one makes a direct measurement of the actual bandwidth at time t, the uncertainty on this measure is very small, and it should therefore have a very strong impact on the estimation process at time t. However, as t increases, the uncertainty also increases as the actual bandwidth may drift away from the initial measurement. This drift may then be captured via a time-series model, and complemented by indirect measurements (e.g., based on delay, jitter, etc. measurements). As long as both sources agree, there is no reason to perform any further direct measurement, which may be very expensive, but if the prediction of the time-series model and the regression diverges, this may trigger another direct measurement. In some embodiments, NAM 246 may determine whether a direct measurement of any of path data 450 is needed based on a measure of confidence associated with a model used by its learning machine.

In some embodiments, PCAN 247 may couple the variation of DV(P) with the observed local state. In some cases, it may be necessary to adapt the shaping for a given destination D along a path P according to the predicted and/or observed path characteristics, but also the local state observations. For example, PCAN 247 may decide to slow down the rate of shaping for a top-N destination following a path P with a high value of DV(p), if PCAN 247 observes that the effect of such a shaping rate change is very high (e.g., if the rate of packet drops varies very significantly).

Also as shown, architecture 400 may form a control loop whereby path data 450 is monitored after traffic shaping module 248 adjusts a data rate for a particular destination. In such a case, further adjustments may even be made until PCAN 247 determines that DV(P) no longer exceeds a threshold amount, based on the observed path characteristic (e.g., one or more of the metrics 452-458) and/or on a predicted path characteristic in predictions 404. PCAN 247 may also record and report on an initiated traffic shaping to another device (e.g., NMS 150, etc.).

Figure 5A:
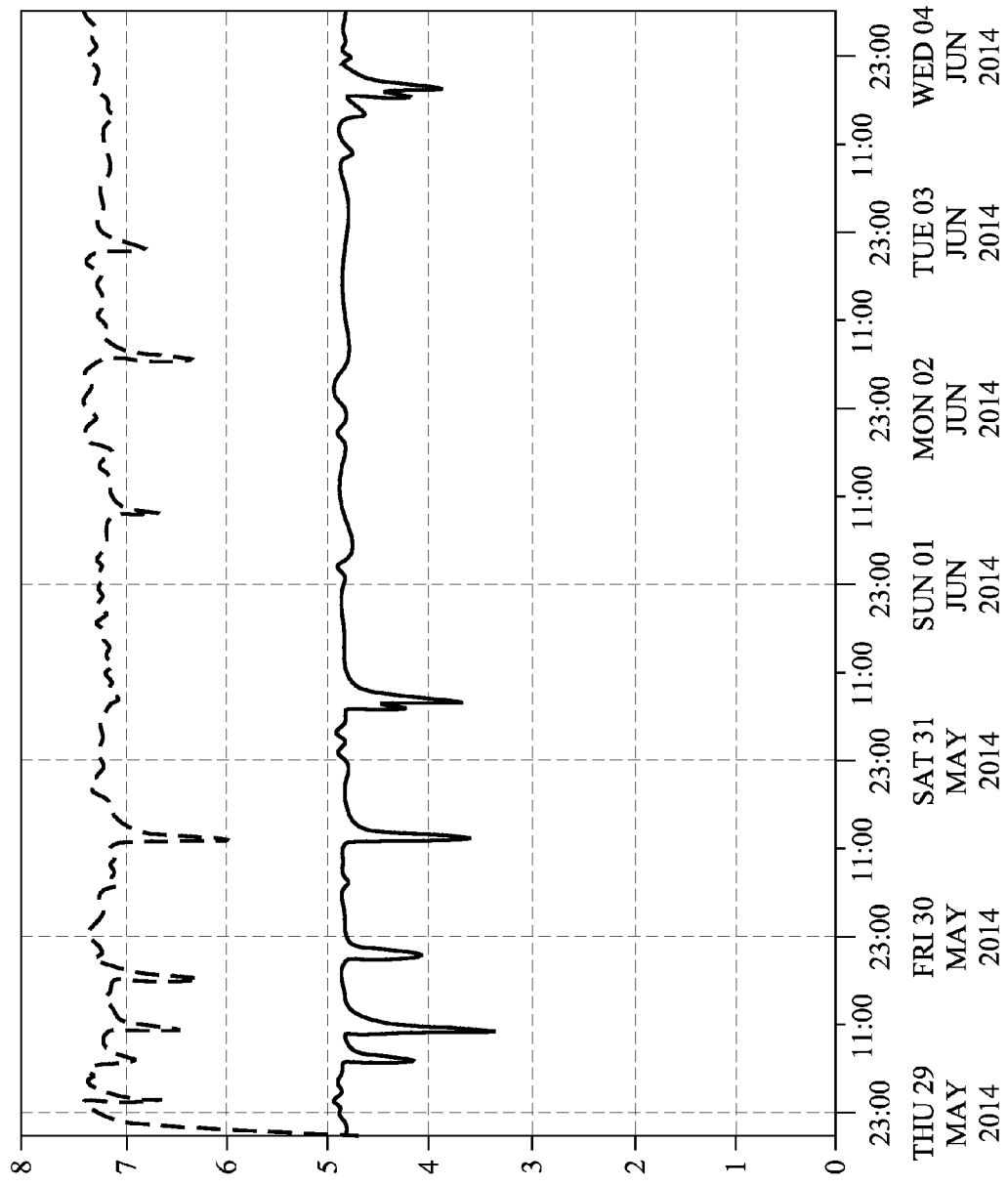
FIGS. 5A-5C illustrate example path characteristic measurements.
Figure 5B:
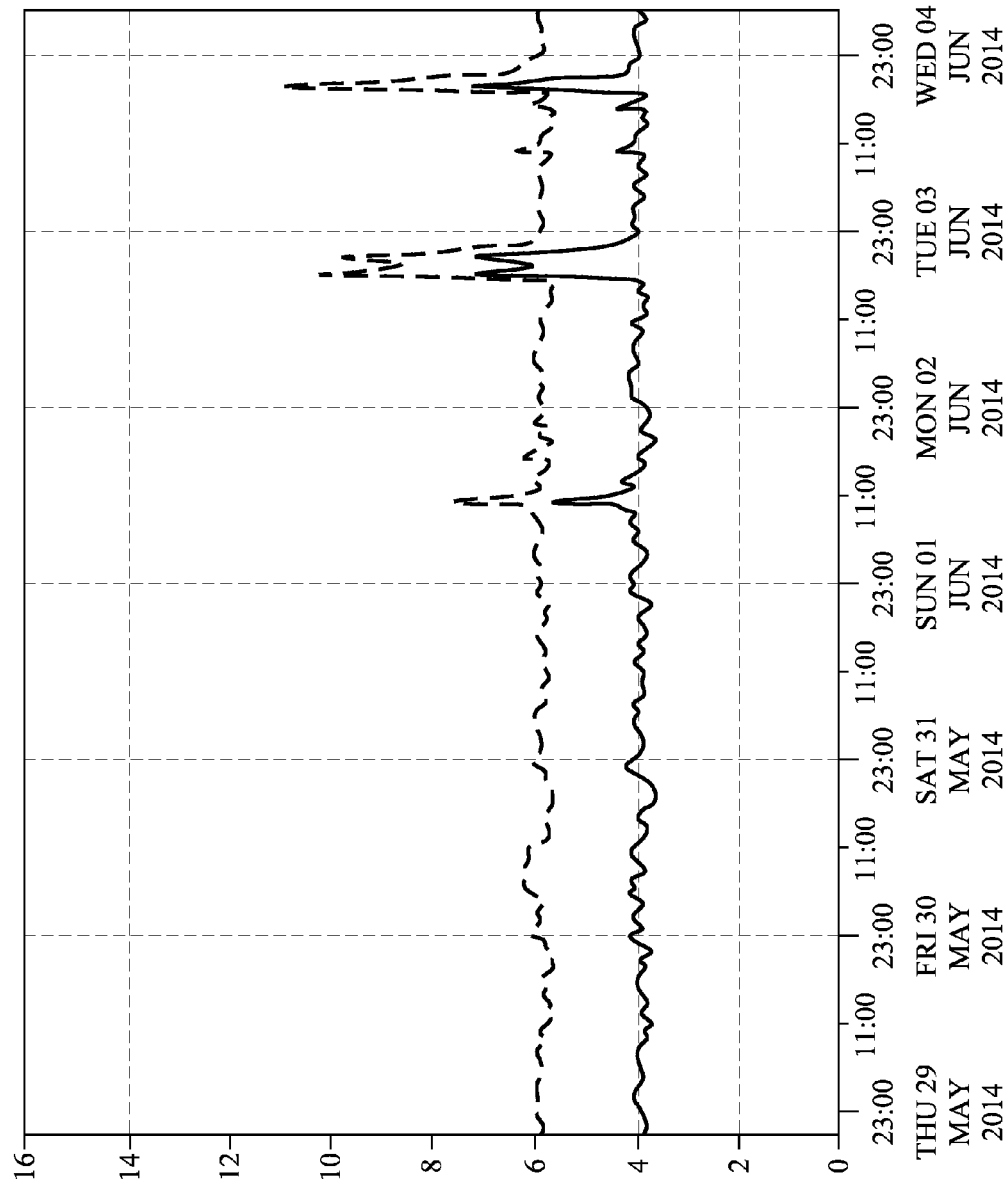
Figure 5C:
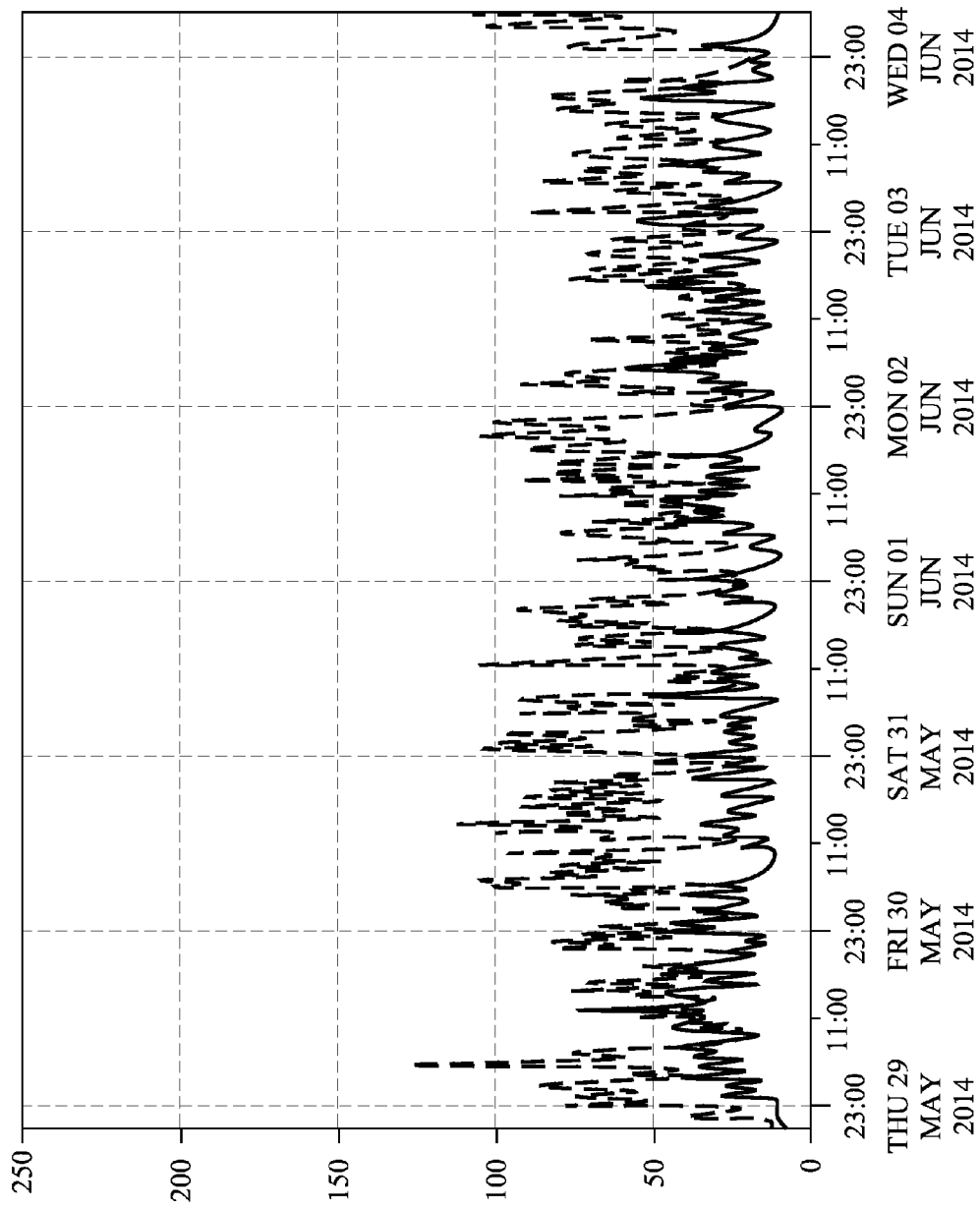

FIGS. 5A-5C illustrate example path characteristic measurements, according to various embodiments. As shown, path characteristics were measured over a period of time, to determine their variability. As demonstrated in FIG. 5A, the characteristics of certain paths are extremely predictable and may be well suited for static (e.g., non-changing) traffic shaping strategies. However, as shown in FIGS. 5B-5C, other paths may exhibit considerable deviation in their characteristics. In such cases, PCAN 247 and, more generally architecture 400, may be used to dynamically adjust the shaping rates used along the paths, accordingly.

Figure 6:
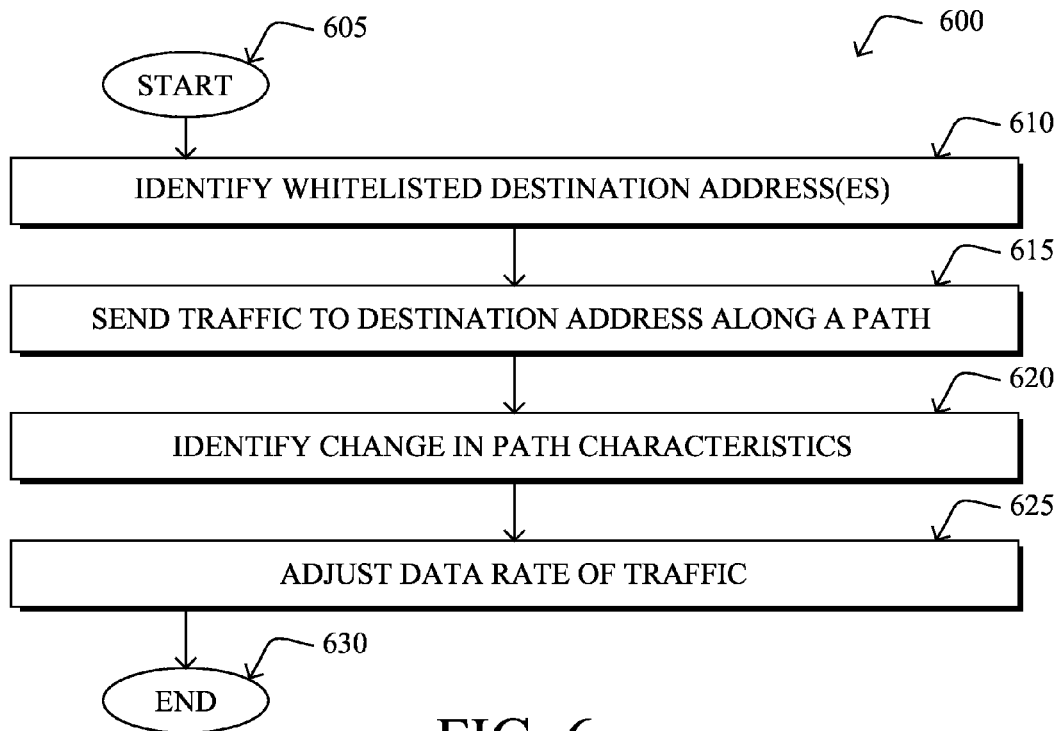
FIG. 6 illustrates an example simplified procedure for performing dynamic traffic shaping on a per-destination basis.

FIG. 6 illustrates an example simplified procedure for dynamically adjusting a traffic shaping rate on a per-destination basis, in accordance with one or more embodiments described herein. The procedure 600 may start at step 605, and continues to step 610, where, as described in greater detail above, a device identifies a set of whitelisted destination address(es). For example, a CE router (e.g., CE router 110) may identify a set of one or more destination addresses for which traffic shaping is to be performed by the router (e.g., the destinations have been whitelisted for use with the dynamic traffic shaping mechanism). In some cases, the list of destinations may be received by the router from a supervisory device, such as a network controller, NMS (e.g., NMS 150, etc.). In other cases, the router may itself identify the destination addresses. For example, the router may be configured to perform dynamic traffic shaping for its top n-number of destinations. In various embodiments, the destination address(es) may be associated with further data used to control when dynamic traffic shaping to a destination is to be used. For example, a destination address may be associated with a particular traffic class/type, coloration, or time period, for which the traffic shaping to the destination is to be performed (e.g., only certain types of traffic to the destination may be eligible for dynamic traffic shaping).

At step 615, the device sends traffic to the destination along a communication path and at a first data rate, as detailed above. In some embodiments, the data rate may be determined by a static traffic shaping mechanism (e.g., the rate is capped or fixed until dynamic shaping for the traffic is enabled). In other embodiments, the data rate may be determined by a dynamic traffic shaping mechanism, according to the destination, traffic type, time of day, etc.

At step 620, the device identifies a path characteristic change for the communication path used in step 615. The path characteristic may be, or may be based on, the amount of delay, jitter, congestion, packet loss, combinations thereof, or the like, for the path. For example, in some cases, the characteristic may be an n-dimensional vector that any or all of these metrics. In one embodiment, the path characteristic change may be an actual change observed along the path. For example, the path characteristic may be monitored, to detect a change. In another embodiment, the path characteristic change may be a predicted change. For example, a learning machine may be trained to predict when a path characteristic change may occur in the future. In various embodiments, the path characteristic change may be identified by calculating a degree of variability for the path characteristic. For example, a degree of variability may be calculated by clustering a history of the path characteristics and determining the difference between the predicted or observed characteristic from the clusters. In another example, the degree of variability may be calculated by analyzing changes in the PDF of the delay experienced along the path, the statistical moment of the jitter PDF, the degree of elasticity of the traffic sent to the destination, or using any other form of statistical analysis.

At step 625, as detailed above, the device adjusts the data rate at which the traffic is sent, in response to identifying the path characteristic change. In various embodiments, the data rate may be adjusted based on the changed path characteristic. For example, the device may decrease the data rate for the traffic if the amount of packet loss along the path increases or is predicted to increase. Notably, the data rate adjustment may only be performed on a per-destination basis and may be specific to certain traffic flows and/or performed only at certain times. In one embodiment, steps 615-625 may also be repeated any number of times as part of a control loop, thereby adjusting the data rate until a desired path characteristic is satisfied (e.g., the amount of dropped packets may decrease with the data rate, etc.). Procedure 600 then ends at step 630.

Figure 7:
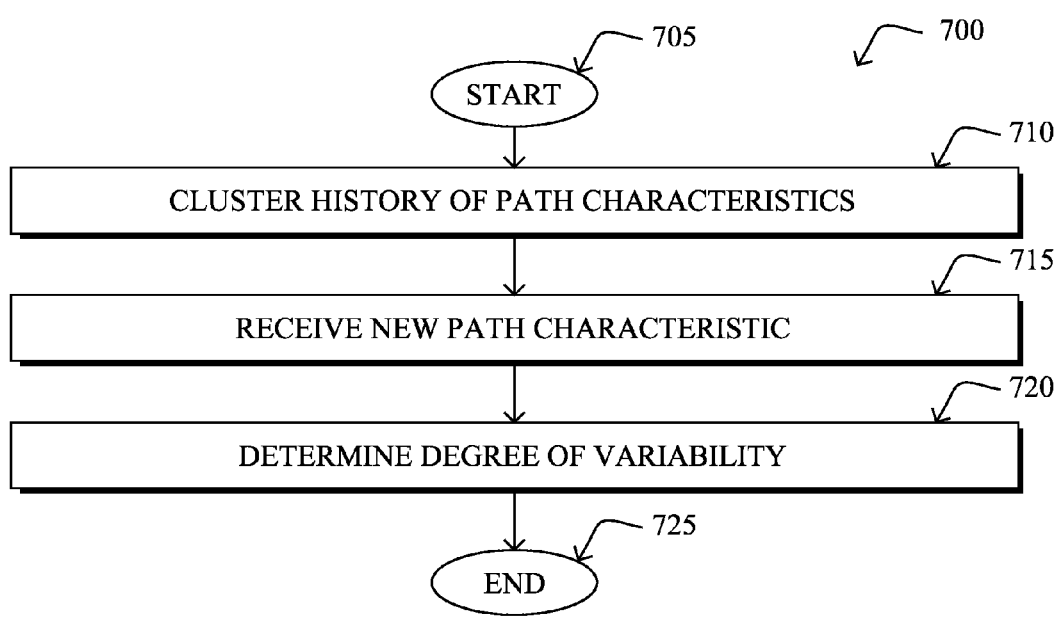
FIG. 7 illustrates an example simplified procedure for identifying a change in a performance characteristic of a path.

FIG. 7 illustrates an example simplified procedure for identifying a change in a performance characteristic of a path in accordance with one or more embodiments described herein. The procedure 700 may start at step 705, and continues to step 710, where, as described in greater detail above, a device clusters a history of path characteristics. As noted above, a path characteristic may include one or more metrics regarding the performance of the path to a particular destination in a network (e.g., delay, jitter, etc.). In general, such clustering may form groups of path characteristics.

At step 715, the device receives a new path characteristic, as detailed above. In one embodiment, the new path characteristic may be a newly observed characteristic of the path (e.g., as part of a reactive traffic shaping mechanism). In another embodiment, the new path characteristic may be a predicted path characteristic (e.g., as part of a predictive traffic shaping mechanism). For example, a machine learning process may model a history of characteristics for the path, to predict a future characteristic of the path.

At step 720, the device determines a degree of variability between the new path characteristic and the history of path characteristics, as described in greater detail above. For example, if the new path characteristic is a vector v having a dimensionality of n (e.g., a vector of n-number of path metrics), the degree of variability in the characteristic may be computed as the distance between the vector v and the clusters from step 710 (e.g., the distance to the nearest cluster, the distance to the nearest cluster centroid, etc.). Notably, the degree of variability may be compared to a threshold value, to determine whether dynamic traffic shaping should be used for traffic along the path. Procedure 700 then ends at step 725.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for dynamic traffic shaping that may be performed on a per-destination basis and may be based, in some cases, on a predicted path characteristic change to one of the destinations. Such techniques may be fully automated, thereby allowing the traffic shaping to be applied on a large scale within a network.

While there have been shown and described illustrative embodiments that provide for dynamic traffic shaping, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of networks and/or protocols (e.g., wireless). In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    maintaining, by a device in a network, a list of a set of one or more destination addresses which require traffic shaping to be performed by controlling the data rate at which traffic is sent to the one or more destination addresses;
    sending, by the device, the traffic to one of the destination addresses along a communication path in the network and at a particular data rate;
    identifying, by the device, a change in a performance characteristic for the communication path, wherein the communication path is a particular communication path; and
    in response to identifying the change in the performance characteristic for the communication path, performing, by the device, the traffic shaping on a per-destination basis by adjusting the data rate at which the traffic is sent along the communication path.

2. The method as in claim 1, wherein the change in the performance characteristic for the communication path is predicted by a machine learning process.

3. The method as in claim 1, wherein the change in the performance characteristic for the communication path is an observed change in the communication path.

4. The method as in claim 1, wherein the destination address is associated with a rule that controls when the data rate is to be adjusted, wherein the rule specifies at least one of: a time period in which the data rate is to be adjusted, a traffic class that corresponds to the sent traffic, or a traffic coloring that corresponds to the sent traffic.

5. The method as in claim 1, wherein the one or more destination addresses are identified by the device as top communication destinations used by the device.

6. The method as in claim 1, wherein the performance characteristic corresponds to one or more of: a delay along the path, an amount of jitter along the path, or an amount of dropped packets along the path.

7. The method as in claim 1, wherein identifying the change in the performance characteristic of the communication path comprises:
    determining a degree of variability between the performance characteristic and a history of observed performance characteristics of the communication path.

8. The method as in claim 7, wherein the degree of variability is determined using a clustering model.

9. The method as in claim 1, wherein the data rate is adjusted as part of a closed-loop control mechanism that monitors the performance characteristic as feedback for the adjustment.

10. The method as in claim 9, further comprising:
    providing data regarding the data rate adjustment to a network controller or to a network management system.

11. An apparatus, comprising:
    one or more network interfaces to communicate with a network;
    a processor coupled to the network interfaces and configured to execute one or more processes; and
    a memory configured to store a process executable by the processor, the process when executed operable to:
        maintain a list of a set of one or more destination addresses which require traffic shaping to be performed by controlling the data rate at which traffic is sent to the one or more destination addresses;
        send the traffic to one of the destination addresses along a communication path in the network and at a particular data rate;
        identify a change in a performance characteristic for the communication path, wherein the communication path is a particular communication path; and,
        in response to identifying the change in the performance characteristic for the communication path, perform the traffic shaping on a per-destination basis perform the traffic shaping on a per-destination basis by adjusting the data rate at which the traffic is sent along the communication path.

12. The apparatus as in claim 11, wherein the change in the performance characteristic for the communication path is predicted by a machine learning process.

13. The apparatus as in claim 11, wherein the change in the performance characteristic for the communication path is an observed change in the communication path.

14. The apparatus as in claim 11, wherein the destination address is associated with a rule that controls when the data rate is to be adjusted, wherein the rule specifies at least one of: a time period in which the data rate is to be adjusted, a traffic class that corresponds to the sent traffic, or a traffic coloring that corresponds to the sent traffic.

15. The apparatus as in claim 11, wherein the one or more destination addresses are identified by the device as top communication destinations used by the device.

16. The apparatus as in claim 11, wherein the performance characteristic corresponds to one or more of: a delay along the path, an amount of jitter along the path, or an amount of dropped packets along the path.

17. The apparatus as in claim 11, wherein the change in the performance characteristic of the communication path is identified by:
  determining a degree of variability between the performance characteristic and a history of observed performance characteristics of the communication path.

18. The apparatus as in claim 17, wherein the degree of variability is determined using a clustering model.

19. The apparatus as in claim 11, wherein the data rate is adjusted as part of a closed-loop control mechanism that monitors the performance characteristic as feedback for the adjustment.

20. A tangible, non-transitory, computer-readable media having software encoded thereon, the software when executed by a processor operable to:

maintain a list of a set of one or more destination addresses for which traffic shaping is to be performed by controlling the data rate at which traffic is sent to the one or more destination addresses;

send the traffic to one of the destination addresses along a communication path in the network and at a particular data rate, wherein the communication path is a particular communication path;

identify a change in a performance characteristic for the communication path; and in response to identifying the change in the performance characteristic for the communication path, perform the traffic shaping on a per-destination basis perform the traffic shaping on a per-destination basis by adjusting the data rate at which the traffic is sent along the communication path.

* * * * *